J. SAVOIE.
BRIDGE CONNECTION FOR LENSES FOR SPECTACLES.
APPLICATION FILED JULY 7, 1910.

977,227.

Patented Nov. 29, 1910.

Witnesses
Ada E. Hazelto
Elsa B. Dana

Inventor
Joseph Savoie
by Joseph A. Miller
Attorney

THE NORRIS PETERS CO., WASHINGTON, D. C.

UNITED STATES PATENT OFFICE.

JOSEPH SAVOIE, OF CENTRAL FALLS, RHODE ISLAND.

BRIDGE CONNECTION FOR LENSES FOR SPECTACLES.

977,227.   Specification of Letters Patent.   Patented Nov. 29, 1910.

Application filed July 7, 1910. Serial No. 570,775.

*To all whom it may concern:*

Be it known that I, JOSEPH SAVOIE, a subject of Great Britain, residing at Central Falls, in the county of Providence and State of Rhode Island, have invented a new and useful Improvement in Bridge Connections for Lenses for Spectacles, of which the following is a specification.

This invention relates to new and useful improvements in bridge connections for lenses for spectacles.

The object of the present invention is to provide means whereby the bridge of spectacles will be held away from the nose thereby preventing disfiguring or irritation of the nose caused by continuous use of spectacles, as is common in cases where the bridge is adapted to be seated directly on the nose.

Reference will be had to the accompanying drawings forming a part of this specification and wherein like numerals of reference designate corresponding parts throughout the several views in which—

Figure 1:
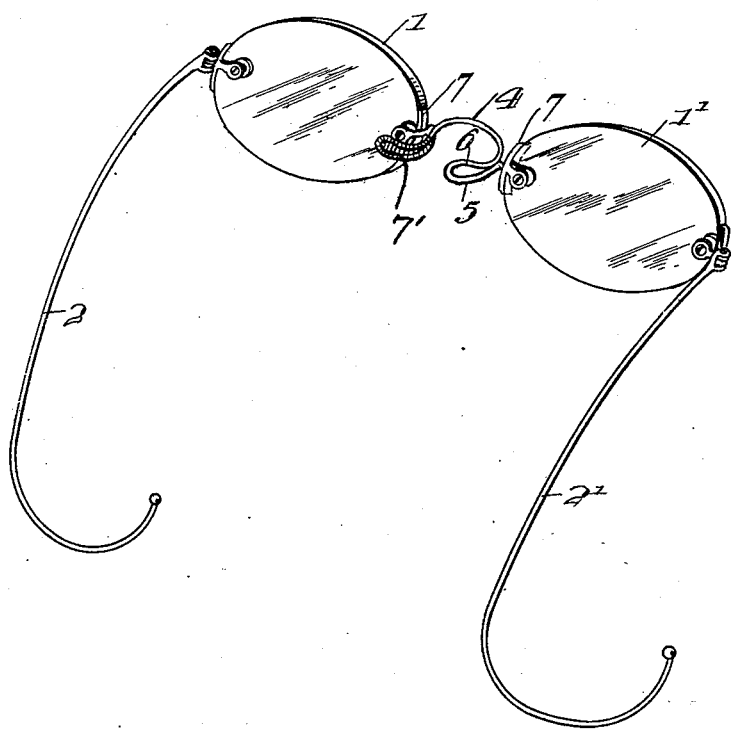
Figure 2:
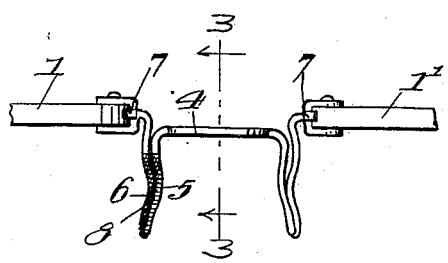
Figure 3:
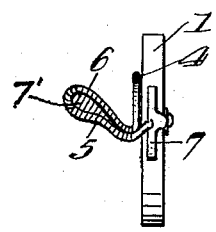

Figure 1 is a perspective view of a pair of spectacles provided with a link connection constructed in accordance with the present invention, Fig. 2 is a bottom plan view of Fig. 1 with parts of the lens broken away, and Fig. 3 is a sectional view on line 3—3 of Fig. 2.

Reference numerals 1 1' indicate a pair of lenses provided with the usual temples 2 2'. Intermediate the lenses 1 1' forming connecting means for same is the usual bridge 4 of curved contour so as to conform to the shape of the nose. This bridge 4 may be made of any suitable material though wire is favored. Extending outwardly in substantially the same direction as the said temples 2 2' and at right angles to the lenses are the guards. These guards are formed by looping the ends of the wire forming the bridge portion 4 and bending same slightly upward, forming spaced members 5 and 6. The outer ends of the guards are bent or curved slightly outwardly away from each other in the direction of the lenses (Fig. 2), thereby giving the inner faces of the said guards or loops a slightly convex shape conforming to the shape of that portion of the nose upon which the guards are adapted to rest. These guards are wound with thread 7' or the like, the strands being spaced and disposed transversely about the members 5 and 6 in such a manner as to allow circulation of air through same, thereby forming a ventilating guard. If preferred, the outer or back portion of the thread, that is, that part which does not rest on the nose, may be coated with any suitable cement as 8, to retain the threads in position. The ends of the wire after forming the bridge 4 and guards are extended and provided with the usual saddle clips 7 for attachment to the lenses 1 1'.

It will be seen from the above that due to the wings or guards, which are so shaped that their outer ends are directed upwardly and are curved outwardly away from one another the wings or guards when resting on the sides of the nose, prevent contact between the bridge and the top of the nose.

Having thus described my invention, what I claim as new and desire to secure by Letters Patent is—

1. In spectacles, a lens connection including a bridge, having a pair of wings, each wing being formed of two spaced members, the wings being curved outwardly with respect to each other and extending upwardly to about a line with the top of the bridge.

2. In a guard for spectacles, a pair of members arranged in spaced relation, thread wound about said members, so that the strands of the thread are in spaced relation, and a cement applied on the outer face of the thread.

In testimony whereof I have signed my name to this specification in the presence of two subscribing witnesses.

JOSEPH SAVOIE.

Witnesses:
ADA E. HAGERTY,
J. A. MILLER.